July 19, 1966 H. BROSCHKE 3,261,273
PHOTOGRAPHIC CAMERA WITH BUILT-IN EXPOSURE METER
Filed Nov. 12, 1964
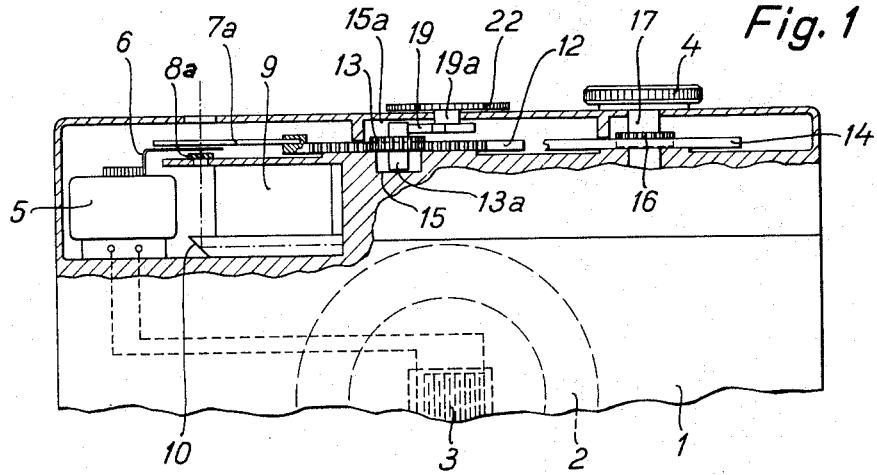
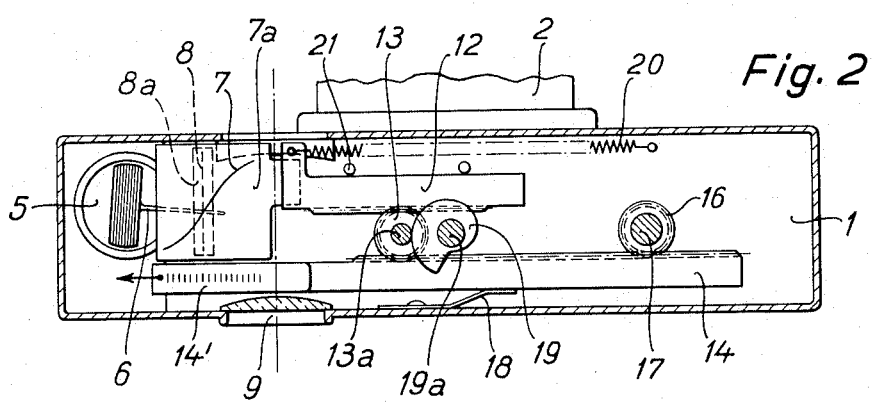
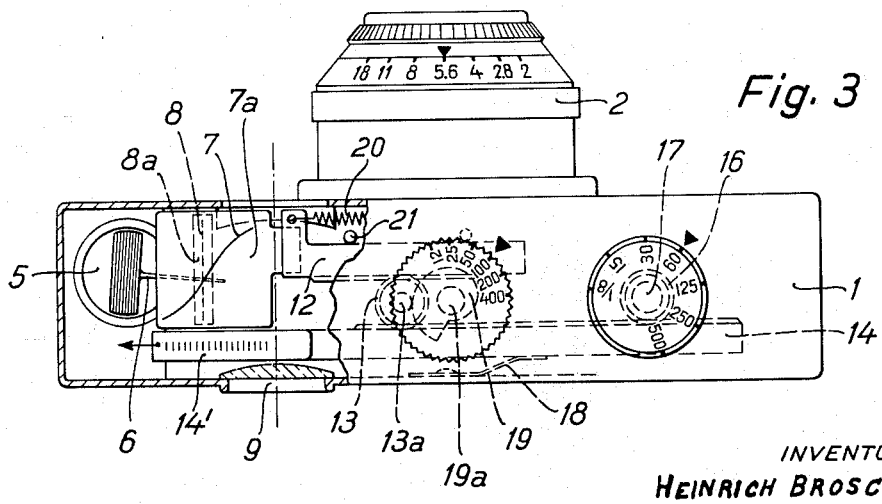
INVENTOR
HEINRICH BROSCHKE
BY Krafft & Wells
ATTORNEYS

3,261,273
PHOTOGRAPHIC CAMERA WITH BUILT-IN EXPOSURE METER

Heinrich Broschke, Wetzlar, Germany, assignor to Ernst Leitz G.m.b.H., Wetzlar, Germany
Filed Nov. 12, 1964, Ser. No. 410,482
Claims priority, application Germany, Nov. 16, 1963, L 46,367
3 Claims. (Cl. 95—10)

The invention relates to a photographic camera with an exposure measuring device having an automatically displaceable indicator for adjusting the mechanism of the camera.

The camera adjuster can be an adjustable exposure control where the exposure is regulated by a special differential mechanism between the adjustable shutter timing member and the diaphragm opening control, or if the diaphragm is regulated separately by the exposure or light measuring device, it can operate the adjustable shutter timer alone. The automatic diaphragm can be operated by a light measuring device behind the camera objective, or the diaphragm can be provided with a light filtering medium in front of the photo-electric device, or can be coupled with a resistance means in the circuit of the light meter.

It is old to provide an adjustable film sensitivity compensating member connection between the camera adjuster and the exposure indicator in order to compensate for certain photographic constant such as film sensitivity, filter factor, etc. Such prior art camera is disclosed in U.S. Patent No. 3,093,043, issued to G. Kinder.

In high grade cameras it is possible for the adjustable shutter timing member to have a greater range of exposure times indicated on it than are indicated by the exposure meter. For example, an exposure meter may have indicated upon it about twelve exposure values while on the adjustable shutter timing member of the camera eighteen exposure values could be marked, the shorter times being coupled with the shutter while the longer ones have to be manually timed with the shutter in the bulb position.

Depending on the sensitivity of the film, the twelve exposure values of the exposure meter are extended across the scale of the eighteen exposure periods either in the direction of the shorter or the longer exposure periods.

In order to adjust the relative displacement between the adjustable shutter timing member and the exposure indicator, a follow-up curve superimposed over the exposure indicator and connected to the timing member by a driving member is required. It can then happen that with the use of highly sensitive films the range of the exposure meter is shifted to a range of low exposure values, lower than the low settings of the adjustable shutter timer, while on the other hand with less sensitive films the range of the exposure meter extends into the manually controlled bulb range of the shutter.

In the latter case exposure measurements can be made in a range in which the exposure periods for which the timing member is set are no longer coupled with the shutter. A disengageable clutch can be interposed between the timing member and the shutter which will break the connection between the shutter and the timer and leave the shutter in the bulb setting.

In the first case, an uncoupling of the exposure indicator from the timing member is necessary because in this case automatically controlled exposure periods which are already beyond the range of the light meter can still be imposed upon the timing member.

In order to permit these camera settings to be diverted, it is necessary to interpose in the driving connections between the timing member and the follow-up curve a disengageable clutch which is disengaged when the follow-up curve has reached its end position while the camera timing member can be moved further. The presence of such a clutch is theoretically not necessary because it is conceivable that the follow-up curve could be swung out beyond the range of the meter counter even after the latter has reached the end of its movement. The available space in modern cameras is usually so restricted, however, that because of space limitations the use of such a clutch is unavoidable. Otherwise the follow-up curve would have to come out of the side of the camera or the casing would be extremely large.

The object of the present invention is to provide an especially simple form of such a clutch which without any additional elements will permit the timing member to be disconnected from the follow-up curve. The invention presupposes that the range of adjustment of the camera extends beyond the range of the exposure meter in only one direction, preferably in the direction of lower exposure values. In such a case the clutch needs to be operable by movement in only one direction and the technical problem is solved by turning the coupling means which connects the shutter-timing member to the follow-up curve for corresponding movement and in addition allows for a displacement of the timing member and the follow-up curve relative to each other by means of a means of a unilaterally disengageable clutch.

As is well known in the prior art the relative displacement of follow-up curve to the shutter-timing member serves the introduction of photographic constants, i.e. mainly film sensitivity and filter factor.

In case the coupling means comprises a differential gearing and the exposure constants are introduced by way of adjusting the position of the spider pinion it is an object of the invention to design the device for introducing the constants in the form of a control curve or cam against which the driving member is forced by spring pressure. Examples of prior art differential camera gearing are illustrated in U.S. Patent 3,094,051, issued to M. R. Hutchison, Jr. et al.

The specific embodiment of the invention shown in the drawings is a camera in which the light intensity is measured behind the objective and in which the connection between the timer and the follow-up curve is a rack and pinion differential gearing.

Upon further study of the specification and claims, other objects and advantages of the present invention will become apparent.

In the drawings—
FIGURE 1 shows schematically the rear of the camera, with its upper portion in section;
FIGURE 2 shows schematically a plan view of the camera in horizontal section; and
FIGURE 3 is a top plan view of the camera.

The exposure measuring device consists of a stationary exposure meter 5, with pointer 6, and a photocell 3. This cell, which may be either a photoelectric element or a photosensitive resistance, is positioned in the camera behind the objective 2 and behind its diaphragm so that during a measurement the size of the diaphragm opening will be automatically compensated for.

The meter pointer 6 is deflected in counter-clockwise direction (FIGS. 2 and 3) if light impinges on the photoelectric cell 3 and it operates in coordination with a follow-up indicator curve 7 which is operatively connected with the adjustable shutter timing member 4. The camera will be correctly adjusted when the meter pointer 6 and the curve 7 intersect on a stationary reference line 8. The correct camera adjustment is visible in the finder 9 when the follow-up curve 7 on the transparent plate 8a, together with the meter pointer 6, are brought into coincidence by suitable optical means such as the prism 10 (FIGURE 1) in the field of vision of the finder 9.

The plate 7a is fastened to a rack 12 which meshes with an intermediate pinion 13 which is on its opposite side in mesh with a rack 14. The axis 13a of the pinion 13 is guided between two stationary plates 15, 15a positioned parallel to the racks 12 and 14. The rack 14 is also in mesh with a pinion 16 on a time setting shaft 17 which carries an adjustable shutter timing member 4 on its end outside the housing. The shaft 17 is also operatively connected to suitable linkages for setting the timing mechanism of the shutter. The timing member 4 is therefore connected with the follow-up curve 7 through pinion 16, rack 14, intermediate pinion 13, and the rack 12, the latter being drawn in one direction by the spring 20 with its movement limited by a stop 21.

Behind the finder window 9 the rack 14 has a transparent slider 14' attached to it on which the exposure times are marked so that the required exposure time will be reflected into the finder 9.

The intermediate pinion 13 is acted upon by a radial cam 19 whose axis 19a is rotatably mounted in the housing so that the position of the intermediate pinion can be controlled from outside. The axis 19a extends through the upper wall of the housing where it carries a setting dial 22 to adjust for exposure constants such as film sensitivity.

The operation of the device is as follows: the camera is first pointed to the object with the diaphragm in its preferred setting. The meter pointer 6 then swings into view, according to the existing light intensity. The timing member 4 is then rotated to bring the follow-up curve 7 into coincidence with the meter pointer 6 on the stationary reference line 8. The rotation of the timer 4 brings the curve 7 upon the point of intersection of the pointer 6 and reference line 8. Rotation of the timing member 4 acts through axis 17 and pinion 16 to shift the rack 14 when it then acts through pinion 13 to shift the other rack 12 and the plate 7a and the curve 7 in the opposite direction. Such movement occurs under the tension of the spring 20 which is weaker than the friction of these moving parts which will therefore remain in their adjusted positions. The spring 20 serves only to maintain a constant unidirectional bias of all moving parts and on occasions to hold the rack 12 at one end of its movement against the stop 21. During such movement the pinion 13 bears steadily with its axis 13a against the cam 19 and can exercise only rotary motion. Another spring 18 urges the rack 14, pinion 13, and rack 12 toward the stop 21 and thereby ensures complete meshing of these parts with one another.

An introduction of exposure constants by rotation of the setting dial 22 will also effect rotation of the cam 19 causing the pinion 13 to travel along the rack 14 which is stationary at that time. Such travel of the pinion 13 will also cause shifting of the rack 12 and with it the plate 7a and curve 7 without changing the setting of the timer 4. The result will be a relative displacement of the follow-up curve 7 and timer 4, by means of which, e.g. the sensitivity of the film can be compensated for. The film constants are usually introduced prior to adjustment of the timing member and exposure pointer so that the adjustment does not have to be repeated.

The rack 12 has its movement in one direction limited by the stop 21. When in this terminal position the curve 7 intersects the reference line 8 in the outermost lower corner of the field of view. This is the limiting position in which a reading of the meter pointer is possible. If with the diaphragm fully opened the meter pointer swings beyond this position, then the exposure meter can no longer be used. Nevertheless the timing member 4 can still be set for a time exposure over a longer period of time by a plurality of exposures according to the construction of the camera until the bulb range is reached. In order to permit such prolonged exposure times to be used, it is however necessary to disconnect the follow-up curve from the timing member and on occasions also to disconnect the timing member from the shutter.

In the particular embodiment here described, the follow-up curve and timing member are automatically disconnected in the simplest manner. When the rack 12 encounters the stop 21, the rack is momentarily held stationary. Further rotation of the timing member 4 in the direction of longer exposures causes the rack 14 to move in the direction of the arrow, whereby the intermediate pinion 13 will be moved away from the cam 19 and will roll on the rack 12. The timing member 4 will then be free to rotate while the follow-up curve 7 which is ordinarily connected to the timing member 4 will remain stationary. In this manner any of the available remaining longer exposure times can be used.

If a shorter exposure time is to be used, the pinion 13 again rolls to the right in FIGURE 2 on the rack 12 and continues rolling until its axis encounters the cam 19. Thereafter it can only rotate, whereby the rack 12 will be shifted, and the connection between the timer 4 and the curve 7 is reestablished without the necessity of uncoupled any clutch or reconnecting a special handle for manual operation.

It will be understood that this invention is susceptible to modifications in order to adapt it to different usages and conditions and, accordingly it is desired to comprehend such modifications within this invention as may fall within the scope of the appended claims.

What is claimed is:

1. In a photoelectric camera for coordinating the amount of exposure necessary with the shutter timing, the structure comprising: a casing having a reference line, an exposure meter supported within said casing, an exposure indicator attached to and automatically actuated by said meter, an adjustable shutter timing member supported by said casing, a follow-up curve slidably positioned within said casing to be adjustable over said exposure indicator, means connecting said shutter timing member and said follow-up curve for corresponding movement as well as for displacement of said member and said curve relative to each other and said reference line, said means comprising a first pinion connected to said shutter timing member, a first rack slidably mounted within said casing meshing with said first pinion, a second pinion adjustably mounted within said casing and meshing with said first rack, a second rack connected to said follow-up curve and being slidably mounted within said casing and meshing with said second pinion, and spring means holding said second rack in terminal position against stop means.

2. The photographic camera of claim 1, further comprising a transparent scale of exposure times carried by said first rack and means in said casing for viewing said reference line, said member, said curve and said scale.

3. In the photographic camera of claim 1, said second pinion guided and urged unidirectionally by a control cam mounted in the casing, said control cam connected to an adjustable compensating member for exposure constants of the film supported by said casing.

References Cited by the Examiner

UNITED STATES PATENTS

| | | | |
|---|---|---|---|
| 2,358,084 | 9/1944 | Mihalyi | 88—23 |
| 2,879,702 | 3/1959 | Gossen et al. | 95—10 |
| 3,095,790 | 7/1963 | Gebele et al. | 95—10 |

FOREIGN PATENTS

| | | |
|---|---|---|
| 894,047 | 10/1953 | Germany. |
| 974,330 | 11/1960 | Germany. |

NORTON ANSHER, *Primary Examiner.*

J. F. PETERS, *Assistant Examiner.*